(12) United States Patent
Stanek et al.

(10) Patent No.: US 8,924,071 B2
(45) Date of Patent: Dec. 30, 2014

(54) ONLINE VEHICLE MAINTENANCE

(71) Applicant: Ford Global Technologies, LLC, Dearborn, MI (US)

(72) Inventors: Joseph F. Stanek, Northville, MI (US); Siamak Hashemi, Farmington Hills, MI (US); John A. Lockwood, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 13/871,163

(22) Filed: Apr. 26, 2013

(65) Prior Publication Data

US 2014/0324275 A1 Oct. 30, 2014

(51) Int. Cl.
*G07C 5/00* (2006.01)
(52) U.S. Cl.
CPC .................................... *G07C 5/008* (2013.01)
USPC ....................................................... 701/31.4
(58) Field of Classification Search
USPC ....................................................... 701/31.4
See application file for complete search history.

(56) References Cited

U.S. PATENT DOCUMENTS

| | | | |
|---|---|---|---|
| 6,330,499 B1 | 12/2001 | Chou et al. | |
| 6,745,151 B2 * | 6/2004 | Marko et al. | 702/182 |
| 8,041,779 B2 | 10/2011 | Habaguchi et al. | |
| 8,099,308 B2 | 1/2012 | Uyeki | |
| 8,301,333 B2 | 10/2012 | Singh et al. | |
| 8,306,687 B2 | 11/2012 | Chen | |
| 2005/0038581 A1 * | 2/2005 | Kapolka et al. | 701/29 |
| 2005/0065678 A1 * | 3/2005 | Smith et al. | 701/29 |
| 2007/0173993 A1 * | 7/2007 | Nielsen et al. | 701/35 |
| 2011/0029186 A1 * | 2/2011 | Ishikawa | 701/30 |
| 2011/0047418 A1 * | 2/2011 | Drees et al. | 714/57 |
| 2011/0071724 A1 * | 3/2011 | Heine et al. | 701/33 |
| 2011/0145026 A1 * | 6/2011 | Singh et al. | 705/7.11 |
| 2011/0238258 A1 * | 9/2011 | Singh et al. | 701/33 |
| 2012/0053778 A1 * | 3/2012 | Colvin et al. | 701/29.4 |
| 2012/0116609 A1 | 5/2012 | Jung et al. | |
| 2012/0136802 A1 * | 5/2012 | McQuade et al. | 705/347 |

FOREIGN PATENT DOCUMENTS

EP 2302597 A1 3/2011

* cited by examiner

*Primary Examiner* — Thomas Tarcza
*Assistant Examiner* — Alex C Dunn
(74) *Attorney, Agent, or Firm* — Jennifer M. Stec; Brooks Kushman P.C.

(57) ABSTRACT

A system includes a vehicle controller having a processor and in communication with a communications device and vehicle display, the controller configured to receive a sensor input containing at least one of a fault trigger and a contextual data captured during the fault trigger. The controller may analyze, via the processor, the fault trigger to determine a fault event. The controller may determine an appropriate service center and transmit, via the communications device, the fault event and contextual data to the service center. The controller may be configured to receive an analysis report and an appointment request and output the analysis report and appointment request to a vehicle display device.

20 Claims, 3 Drawing Sheets

ONLINE VEHICLE MAINTENANCE

BACKGROUND

Modern vehicles are complex electrical and mechanical systems that utilize many devices, modules, sub-system, etc., that communicate among and between each other to help the vehicle operate safely and efficiently. As with many systems, these types of devices, modules, sub-systems, etc., are susceptible to errors, failures and faults that affect the operation of a vehicle. When such errors or faults occur, often the affected device or component will issue a fault code, for example a diagnostic trouble code (DTC). The DTC may be received by component or system controller, which may be analyzed by a service technician or engineer. However, many times the driver does not know when a device or component has failed, or whether a repair is critical to be fixed immediately or how much a repair may cost. Further, a DTC may be triggered for a variety of reasons, making it difficult to diagnose the base cause of a problem. This may result in an inability to find and cure the defect, ultimately leading to customer dissatisfaction.

SUMMARY

A system includes a vehicle controller having a processor and in communication with a communications device and vehicle display, the controller configured to receive a sensor input containing at least one of a fault trigger and a contextual data captured during the fault trigger. The controller may analyze, via the processor, the fault trigger to determine a fault event. The controller may determine an appropriate service center and transmit, via the communications device, the fault event and contextual data to the service center. The controller may be configured to receive an analysis report and an appointment request and output the analysis report and appointment request to a vehicle display device.

A vehicle diagnostics system includes a sensor for detecting a fault trigger and a vehicle display configured to receive a user input. The system may include a communications device configured to communicate with a service center and a processor in communication with the sensor, the vehicle display, and the communications device. The processor may be configured to receive the fault trigger and determine the close or preferred service center. The processor may communicate the fault trigger to the service center and receive an analysis report and an appointment request from the service center. The processor may output the analysis report and appointment request to the vehicle display.

A method for scheduling vehicle services includes detecting a fault trigger from a vehicle sensor; analyzing the fault trigger to determine a fault event, wherein the fault event includes the underlying problem associated with the vehicle trigger; determining, via a vehicle controller, an appropriate service center; transmitting the fault event to the service center; receiving, via the vehicle controller, an analysis report and an appointment request from the service center; and outputting the analysis report and appointment request to a vehicle display.

DETAILED DESCRIPTION

A system includes a vehicle controller having a processor and in communication with a communications device and vehicle display, the controller configured to receive a sensor input containing at least one of a fault trigger and a contextual data captured during the fault trigger. The controller may analyze, via the processor, the fault trigger to determine a fault event. The controller may determine an appropriate service center and transmit, via the communications device, the fault event and contextual data to the service center. The controller may be configured to receive an analysis report and an appointment request and output the analysis report and appointment request to a vehicle display device.

Figure 1:
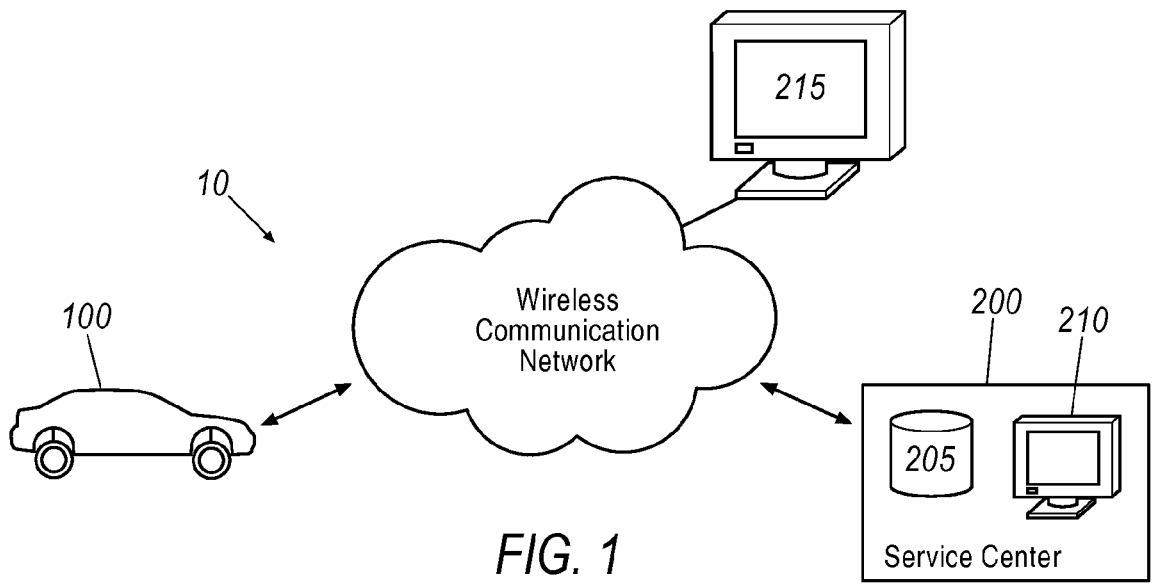
FIG. 1 illustrates a vehicle having an online maintenance system.

FIG. 1 illustrates an exemplary vehicle having an online maintenance system 10. The system 10 may take many different forms and include multiple and/or alternate components and facilities. While an exemplary system is shown in the Figures, the exemplary components illustrated in the Figures are not intended to be limiting. Indeed, additional or alternative components and/or implementations may be used.

As illustrated, the system 10 may have a vehicle 100 in communication with a service center 200. The vehicle 100 may be configured to convert energy into motion for the purpose of transporting goods or passengers. Accordingly, the vehicle 100 may include any type of passenger or commercial automobile, such as a car, truck, sport utility vehicle, cross-over vehicle, van, minivan, automobile, tractor. Moreover, the vehicle 100 may include other types of vehicles such as a motorcycle, plane, helicopter, locomotive, or railway car. Although not shown in FIG. 1, the vehicle 100 may generally include a fuel tank, engine, powertrain system, and wheels.

The vehicle 100 may be configured to perform on-board diagnostics to monitor the overall operation of its mechanical and electrical systems and components. The systems and components need to operate smoothly and function properly to ensure a safe and enjoyable driving experience. Many times the vehicle operator may not know when a system or component fails or degrades. The vehicle 100 may be configured to detect system failures or decreased operation performance as a fault trigger. A fault trigger may be produced if a system or component fails, reads outside of its normal parameter range, or is unable to send its output due to an open or short-circuit, for example. Additionally or alternatively, the fault trigger may include a vehicle maintenance reminder (e.g., change oil or 50,000 mile service checkup). Vehicle may further be configured to analyze the fault trigger on-board to determine a fault event, or the underlying problem with the system or component.

The vehicle 100 may be configured to transmit data pertaining to vehicle diagnostics to the service center 200 over a wireless communications network. The service center 200 may be any establishment providing vehicle repairs and services, including vehicle dealerships, original equipment manufacturers (OEM), and automotive repair shops. The service center 200 may include a computer, memory and communication device for sending, receiving, storing and possibly processing fault and vehicle related data. The service center 200 may include a database 205 for storing vehicle and user information, and a server 210 for examining and processing fault related data.

The vehicle 100 and service center 200 may be in communication via any wireless communication network such as high bandwidth GPRS/1XRTT channel, a wide area network (WAN) or local area network (LAN), or any cloud-based communication, for example. In an exemplary implementation, the vehicle 100 and service center 200 may participate in a computing network (e.g., cloud-computing or), and the vehicle 100 may identify the service center 200 based on its Internet Protocol address (IP address) or media access control address (MAC address). For example, the network may be a packet-switched network which may transmit data as a packet that may be shared and routed independently from other transmission. Additionally or alternatively, the vehicle 100 and service center 200 may be in communication over a mobile communications network, such as GSM or CDMA. The service center 200 may identify particular users by the unique device identifier (UDID) or the international mobile station equipment identity (IMEI), which may be transmitted via Bluetooth® wireless, for example, to the vehicle's on-board computer. The vehicle 100 may then transmit relevant fault data (e.g., fault triggers and/or fault events) addressed to the service center 200 over the communication network. That is, the fault data would initially transmit to a network server which would facilitate the transfer of data to a preselected service center 200. The service center 200 may review the fault data transmitted by the vehicle 100 to determine whether it is necessary and/or when to schedule a service appointment. The scheduling of service appointments may be based in response to detection of a fault trigger, fault event, product recall, maintenance services, product services, or combinations thereof. When the service center 200 receives a fault trigger or fault event, the scheduling of an appointment maybe based on analyzing the data received to determine the severity of the fault (e.g., whether immediate action is necessary). Scheduling the service appointment may also be based on the user's scheduling preferences, available dealer appointment times, parts availability, services availability, cost assessment, and/or estimated time needed for repair. The service center 200 may communicate the status of the fault, estimated cost of repair, and appointment request and times to the vehicle 100. The service center 200 may identify particular vehicles by their VIN, or any other suitable identifier (e.g., static IP address of an on-board computer).

Figure 2:
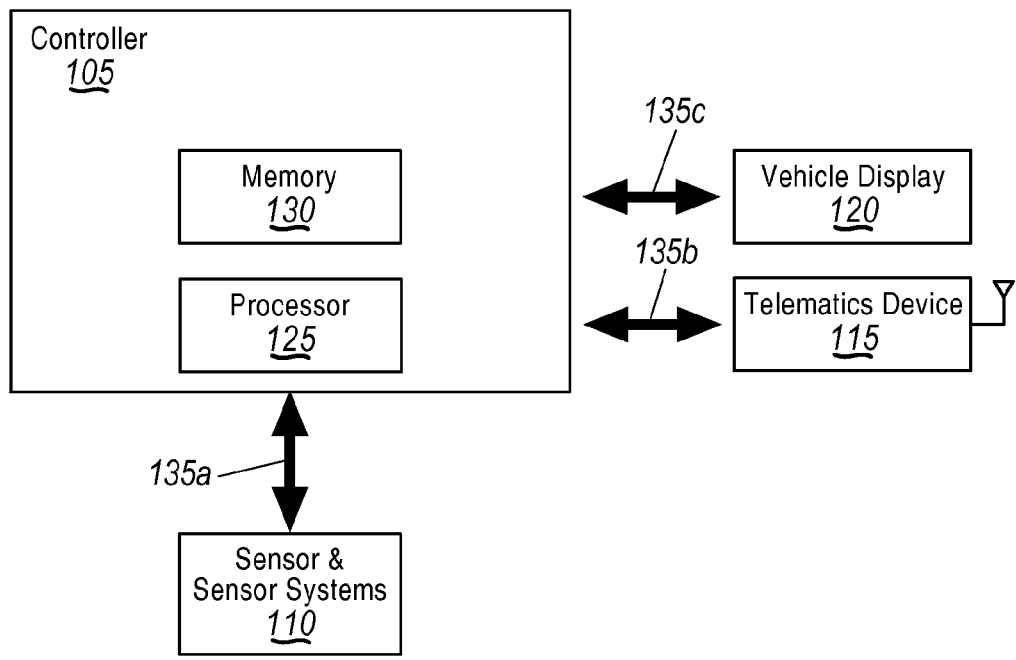
FIG. 2 illustrates exemplary components of the online maintenance system of FIG. 1.

Referring now to FIG. 2, illustrated are exemplary components of the online maintenance system 10. The vehicle 100 may include a controller 105 for monitoring and controlling the various vehicle systems and subsystems. The controller 105 may control the overall operation of the vehicle diagnostics and communication. The controller 105 may be in communication with sensors and sensor systems 110, a telematics device 115, and a vehicle display 120.

The sensors and sensor systems 110 (hereinafter referred to as sensors 110) may monitor the operational status and condition of components of the vehicle 100 and may generate sensor outputs which are indicative of the operational status and conditions of the monitored components. The sensors 110 may measure a wide range of system and component parameters. For example, the sensors 110 may measure engine temperature, battery voltage, fluid flow rate, oil temperature and pressure, transmission and wheel speed, emission control function, cylinder head temperature, etc. The parameter data may be associated with parameter identification (PID) data, which may represent codes used to request data from the vehicle sensors systems 110. If the parameters fall outside of a normal range of operation, a fault code (otherwise referred to as a diagnostic trouble code, or DTC) may be set. For example, if a front tire requires an air pressure of 35 pounds per square inch (psi), and the normal operating range is 1-2 psi difference, a DTC may be triggered after surpassing the 2 psi threshold (e.g., the tires pressure falls outside of 33 to 37 psi). Further, the sensors 110 may monitor contextual data, or circumstances and environmental conditions present during a fault trigger. For example, contextual data may include engine rpm, vehicle speed, engine coolant temperature, intake manifold pressure, fuel pressure, outside temperature, and outside precipitation as an example of a non-exhaustive list. Additionally or alternatively, sensors 110 may also measure outputs from other vehicle components. For example, the airbag crash sensor may contain one or more accelerometer for determining the accelerations of the vehicle structure in order to determine whether the vehicle is experiencing a crash of sufficient magnitude to deploy the airbag.

The system 10 may include an information and communications technology device, such as the telematics device 115, for transmission to the appropriate service center 200. The telematics device 115 may facilitate integration of certain telecommunication functions within the system. For example, a navigation system within the vehicle may be included in the telematics device 115. The navigation system may include a global positioning system (GPS), as well as a radio-frequency identification (RFID), or a cellular device or personal digital assistant (PDA) GPS that is transmitted via a cellphone or PDA by Bluetooth®, for example. Moreover, the telematics device 115 may facilitate communication between the controller 105 and the service center 200. The telematics device 115 may communicate with the service center 200 via a wireless communication network such as a wide area network (WAN), local area network (LAN), or cloud-based communication. Additionally or alternatively, the telematics device 115 may be in communication with a mobile device via Bluetooth®, which may be in communication with the service center 200.

The controller 105 may communicate relevant data to the vehicle display 120. The vehicle display 120 may be a display device configured to present information and options to the user within the vehicle 100. The vehicle display 120 may include a single type display, or multiple display types (e.g., both audio and visual) configured for human-machine interaction. The vehicle display 120 may be configured to receive user inputs from the vehicle occupants. The vehicle display 120 may include, for example, control buttons and/or control buttons displayed on a touchscreen display (e.g., hard buttons and/or soft buttons) which enable the user to enter commands and information for use by the controller 105 to control various aspects of the vehicle 100. For example, inputs provided to the vehicle display 120 may be used by the controller 105 to monitor the climate in the vehicle, interact with the navigation system, control media playback, or the like. The vehicle display 120 may also include a microphone that enables the user to enter commands or other information vocally.

The controller 105 may be in communication with sensors 110, a telematics device 115, and a vehicle display unit 120 via a series of interfaces 135. The interfaces described herein, including the first interface 135A, second interface 135B, and third interface 135C, may include an input/output system configured to transmit and receive data from the respective components. For example, the first interface 135A may facilitate the transfer of sensor data from the various vehicle sensors and sensor systems 110 to the controller 105. Each of the interfaces 135 may include many additional sub-interfaces within the interface. For example, the first interface 135 may include a specific interface for each sensor or sensor system 110 on the vehicle. Moreover, interfaces 135 may be one-directional such that data may only be transmitted in one-direction. For example, the first interface 135A may be configured to transmit sensor data to the controller 105, but not vice versa. Additionally, the interfaces 135 may be bi-directional, both receiving and transmitting data between the components (e.g., the first interface 135A may transmit sensor data to the controller 105, and the controller 105 may transmit data to the sensor 110).

The controller 105 may include any processing device 125 configured to implement one or more processes associated with the operation of the vehicle 100. In general, the controller 105 may be configured to receive various inputs and generate and deliver various outputs in accordance with the inputs received or computer-executable instructions stored in a memory device 130. Computing systems and or devices contained within the vehicle 100, such as the controller 105 and processor 125, may employ any of a number of computer operating systems, including, but not limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating system distributed by Apple, Inc. of Cupertino, Calif., the Blackberry OS distributed by Research in Motion of Waterloo, Canada, and the Android operating system developed by the Open Handset Alliance. Moreover, the vehicle 100 may include any number of controllers 105 and/or processors 125 configured to control the operation of any number of vehicle systems. Each controller 105 may include one or more modules configured to implement a particular feature in the vehicle 100. For example, the controller 105 may include, but is not limited to, a powertrain control module, engine control unit, transmission control module, electric power steering control unit, brake control module, general electronic module, suspension control module, and central timing module.

The processor 125 may be configured to receive data directly sent from the sensors 110. Additionally or alternatively, the sensors 110 may communicate the data to a vehicle bus (not shown), which in turn communicates the data to the processor 125. The processor 125 may be configured to execute one or more processes for detecting vehicle fault data (e.g., fault triggers and/or contextual data) as described herein. The processes may be applied by the processor 125 to identify and classify vehicle faults occurring in the vehicle. For example, for a particular component, such as a tire, the processor 125 may determine from the relevant data output by the sensors 110 whether the tire is functioning properly or whether it requires balancing, additional air, or perhaps replacement. The processor 125 may further be configured to receive the fault data in a raw state, for example, in the case vehicle diagnostics are performed off-board at the service center 200.

The controller 105 may also include a memory device 130 configured to capture and store fault related data. The memory device 130 may be comprised of a flash memory, RAM, EPROM, EEPROM, hard disk drive, or any other memory type or combination thereof. The memory device 130 may store fault data communicated to the controller 105 by the sensors 110. The memory device 130 may store fault data either in a long-term memory (e.g., nonvolatile memory) or a Keep Alive Memory (KAM). A KAM generally stores information in the vehicles memory device 130 until the power is disconnected. Likewise, the memory device 130 may include a diagnostic trouble code (DTC) library, containing various DTCs, underlying issue and problem associated with that DTC, and the parts needed to fix the problem. Additionally or alternatively, the memory device 130 may store contextual data and problem history data. Problem history data may indicate past problems associated with individual parts or components within the vehicle 100. For example, if an oil pressure sensor has output a fault trigger numerous times due to faulty wiring, the memory device 130 may store this problem history and communicate it to the processor 125. Accordingly, it may be easier to diagnose this problem in the future as faulty wiring, as opposed to a defect in the oil pressure sensor. Moreover, the memory device 130 may include a navigation database which may, for example, retrain service center 200 locations, user specific information such as a preferred service center 200, and information relating to previous service centers 200 visited. Additionally, the memory device 130 may retain information relating to service and part availability at the service centers 200.

The controller 105, via the processor 125, may be configured to monitor the parameter data and contextual data output from the sensors 110. The controller 105 may be configured to check the values of many different parameters or combinations of parameter data to see if the values are within the normal operating ranges. During normal operation, the vehicle is constantly monitoring hundreds of parameters and PIDs. If there is an error with any of these parameters or combination of parameters, or if the values detected fall outside of the normal operating range, a fault trigger, such as a DTC may be generated. That is, a DTC may be set if the parameter data surpasses a threshold of the normal operating range. For example, combustion engines may typically operate by burning an air to fuel mixture of about 14.7, or 14.7 parts air to 1 part fuel. The controller 105 may monitor this ratio by measuring the oxygen content in the exhaust with an oxygen sensor. The controller 105 may operate within a specific range of parameters as its normal operating condition, and when the mixture becomes to lean or rich, a fault code (e.g., a DTC) may be produced.

However, if a particular component is degrading, but the parameter data output by the sensor 110 has not surpassed a threshold level (e.g., parameters data does not fall outside the normal operating condition), no fault code (e.g., DTC) will be triggered indicating whether the component needs to be serviced. This may result in decreased performance of the component or the vehicle in whole. Therefore, the controller 105 may be configured to monitor the degradation of a component to determine if it is operating marginally (e.g., not at optimal levels). That is, the controller 105 may be configured to detect a fault in borderline cases where the parameter data output by the sensors 110 does not read outside of the normal operating range. The processor 125 may execute any number of processes and trigger detection points that establish an optimal range of operation prior to the actual DTC being set. The trigger detection points may be used to determine the borderline faults that could affect performance. For example, an air filter sensor may detect whether the air filter has collected a threshold amount of particles (e.g., dust, dirt, or other air borne materials) in order to trigger a DTC. However, air particles may collect in the air filter over time, resulting in increased engine pumping work which may consequently reduce vehicle fuel economy. The controller 105 may be configured to monitor air filter quality by checking the KAM tables or throttle position at a given speed load point. The controller 105, via the processor 125, may then analyze this data to determine whether the air filter is operating within the optimal range of operation. If the data falls outside of the optimal range of operation, but is still within the normal range of operation such that a DTC is not generated, a fault trigger may still be detected by the controller 105 indicating marginal component operation (e.g., the component is degrading, but is still within the threshold range so no DTC is set). Additionally, fluid degradation may be detected by checking the engine oil, transmission fluid, power steering fluid, AC refrigerant, and coolant. Likewise, vehicle alignment may be detected by using the power steering pressure on a straight path by using the vehicle navigation system. Monitoring marginal component operation may allow for timely maintenance and repair before parts completely fail and pose potential harm.

The controller 105 may capture contextual data in a "snapshot" or "freeze frame" fashion when any particular fault trigger occurs. For example, if the sensor 110 reading the vehicles ignition voltage triggers a fault and communicates this parameter data to the controller 105, the controller 105 may capture a freeze frame of all the sensor 110 readings at the time the fault was triggered. This snapshot data may be communicated to the processor 125 to assist in analyzing the underlying problem. For example, if the snapshot data indicates that the outside temperature is below freezing, the fault in the ignition voltage sensor may be due to the frigid temperature rather than a problem with the spark plug, battery, or wiring. Additionally or alternatively, the snapshot data may be communicated to the controller 105 in a raw state and be transmitted to the service center 200 for analysis.

The controller 105 may further be programmed to analyze the fault trigger to determine whether there is a fault event, or merely a false fault warning. For example, some sensors 110 may generate DTCs for an engine misfire if the sensors 110 detect as few as five (5) misfires in two-hundred (200) engine revolutions. As an example, driving on an extremely rough road may produce the same type of variations in crankshaft speed that appear to be engine misfires. There is no need to alert a vehicle user when this happens. The processor 125 may analyze the data and discard the abnormal readings. The processor 125 may take in multiple parameters to make this assessment. For example, instead of solely checking the crankshaft speed, the controller 105 or processor 125 may monitor the firing voltage of each spark plug to assess whether a fault has occurred. A lean misfire (e.g., an imbalanced air/fuel ration—too much air, too little fuel) typically causes a large jump in the firing voltage while a shorted or fouled plug causes a drop in the firing voltage.

With reference to FIGS. 1 and 2, the vehicle 100, via the controller 105, may identify an appropriate service center 200 based on location or user preferences, for example. Service centers 200 may be saved into the on-board navigation database included within the memory device 130. The controller 105 may then determine the closest service center 200 based on the vehicle's location with respect to the service center 200 (e.g., by way of GPS). Additionally, the vehicle user may prefer to schedule service appointments with service centers 200 previously visited. The memory device 130 may keep track of previous visits to service centers 200, and transmit fault data to the closest service center previously visited. Further, the user preferences or customer settings may be configured to automatically transmit fault data to the dealership at which the vehicle was purchased.

The service center 200 may be equipped with a processor for analyzing fault events, fault triggers, and contextual data off-board the vehicle 100. The service center 200 may also include a knowledge base database 205 having stored any product recalls, historical problem history, and related known current problems. Additionally or alternatively, a knowledge base database may be included at a main server 215. The knowledge base may save past problems with a particular vehicle under the vehicle identification number (VIN). Upon any fault transmission (or visit) between the vehicle 100 and service center 200, the fault data may be downloaded and saved into the knowledge base. Accordingly, the knowledge base may create a user profile for each vehicle 100, identifying past problems, previous services performed, expected maintenance checkups, any product recalls based on the make and model of the vehicle 100, and vehicle information such as mileage and updated or customized vehicle parts. Additionally or alternatively, the user profile may also include user information. For example, the user profile may indicate user preferences, such as a preference to receive notifications via email rather than display on the vehicle display 120. The user information may also include the customer's name, preferred advisor at the preferred service center 200, and preferred appointment times. Further, the knowledge base may be configured to identify and store known current problems with specific vehicle parts. For example, it may be known that the fault of a battery regularly dying in a particular vehicle model may be due to leaking alternator diodes, rather than a faulty battery. This may make it easier to identify the root problem in the vehicle 100, saving both time and money.

The service center 200 may analyze or examine fault data (e.g., fault event, fault trigger, contextual data) in conjunction with accessing the knowledge base in order to create an analysis report. The analysis report may indicate the underlying problem with the fault, severity of the fault (e.g., whether immediate action is necessary), the cost and time needed for repair, and the parts necessary for repair (e.g., replace yaw rate sensor or left taillight). After creating the analysis report, the service center 200 may also send an appointment request. The appointment request may provide the available day/time slots to schedule the service appointment. The available day/time slot may be based on the type of serviced needed to be performed on the vehicle. For example, an oil change may have a relatively short appointment whereas replacing a powertrain component may take several hours or days. Further, the service center 200 may examine its inventory and propose times based on whether necessary components are available. The service center 200 may order any necessary parts based on the appointment requests to make sure the parts arrive in time for the appointment. Additionally or alternatively, the service center 200 may notify the vehicle 100 to locate a different service center 200 due to the deficiency in a certain component or the inability to perform a specific service. Similarly, the service center 200 may notify the main server 215 of component or service availability, in which the main server 215 may store such information and/or notify vehicles of this fact. The service center 200 may also include general information such as the service center's location and contact information.

While only one service center 200 is shown in FIG. 1 for clarity and simplicity, additionally or alternatively, multiple service centers 200 may be connected within the wireless communication network, such as a cloud network, thus allowing the service centers 200 to share and transfer vehicle information and data. The service centers 200 may be connected to one another via a main server 215 which may serve as the cloud infrastructure. Additionally, OEMs may be in communication with the main server to provide information regarding product recalls and software updates. The vehicles 100 may communicate first with the main server 215. The main server 215 may include a processor, a position locating device, a communications device, and a database (separate or included within the knowledge database) used to store information of various vehicles 100 (e.g., storing vehicle and problem history associated with each VIN). The main server 215 may be configured to analyze to fault triggers and contextual data, or may simply receive the fault data in raw form and transmit the data to a service center 200. The main server 215 may simply facilitate the communication between vehicle 100 and a preferred or predetermined service center 200. Additionally or alternatively, the main server 215 may route transmissions from the vehicle 100 to the appropriate service center 200 determined by the main server 215. For example, the main server 215 may identify service centers 200 that are within a predefined proximity to the vehicle 100, or route the transmission to the vehicle's preferred service center 200 (e.g., the dealership of vehicle purchase). Subscribing or designated service centers 200 (e.g., OEMs or dealerships) may be able to access the main server 215 to retrieve the vehicle fault data. Thus, the service centers 200 may be able to share and transfer information (e.g., fault data, user preferences, user profile including problem history, and vehicle information such as mileage and customer name) through the main server 215. This may allow easy access to vehicle related data by all of the service centers 200. Thus, if an unfamiliar vehicle 100 comes into the service center 200, the service center 200 merely needs to access the database of the main server 215 in order to obtain information pertaining to the vehicle. For example, the service center 200 may be configured to automatically detect the arrival of a vehicle 100 and connect to the main server 215 to receive instant access to any information relating to the vehicle 100.

The service center 200 or the main server 215 may be configured to transmit vehicle promotional information, such as suggestions on how to more effectively use vehicle features, new financing options, lease inspections, and lease expirations. The service center 200 or main server 215 may identify affected vehicles by their VIN, or any other suitable identifier such as a user profile associated with the static IP address of the vehicle on-board computer. Vehicle promotion information may be cataloged at the service center 200 or the main server 215 for each vehicle 100 under its VIN, for example, expanding the user profile. The service center 200 may initiate communication with the vehicle 100 with any vehicle promotion information or knowledge base information. For example, if a parts manufacturer releases a statement indicating that a particular part needs to be recalled, the service center 200 may notify the vehicle 100 on its own. As such, the vehicle 100, via the telematics device 115, and the service center 200 may by in continual communication, allowing the service center 200 to send updates to be stored in the vehicle (e.g., current known problems, adjustments to the navigation database, parts availability, etc.). Likewise, the service center 200 may send periodic notifications regarding the expiration of a vehicle lease, for example. Additionally or alternatively, the service center 200 or main server 215 may store vehicle information, such as customer VIN, mileage, services and maintenance needed, prior service history, vehicle vitals, etc. The vehicle information may be easily shared and transferred over the cloud network among the subscribing or designated service centers 200. This may help personalize and streamline the customer experience because each subscribing or designated service center 200 will already have a familiarity with the vehicle and customer preferences. This may further boost the service center's relationship with the customers, consequently retaining old customers and possibly bringing in new customers.

The telematics device 115 may relay the analysis report, including the proposed appointment day/time, to the controller 105, which may output the analysis report to the vehicle display 120. Further, the vehicle 100 (via the controller 105) may receive parts and service availability updates from the service center 200. If the service center 200 runs out of a particular part, or does not offer a specific service, it may notify or alert the vehicle 100 of such information. This may directly influence which service center 200 is most appropriate to schedule a service appointment. For example, if the closest service center 200 runs out of wheel bearings that fit 14 mm wheel bolts, the controller 105 may have to identify alternative service centers 200 to repair the problem.

Figure 3:
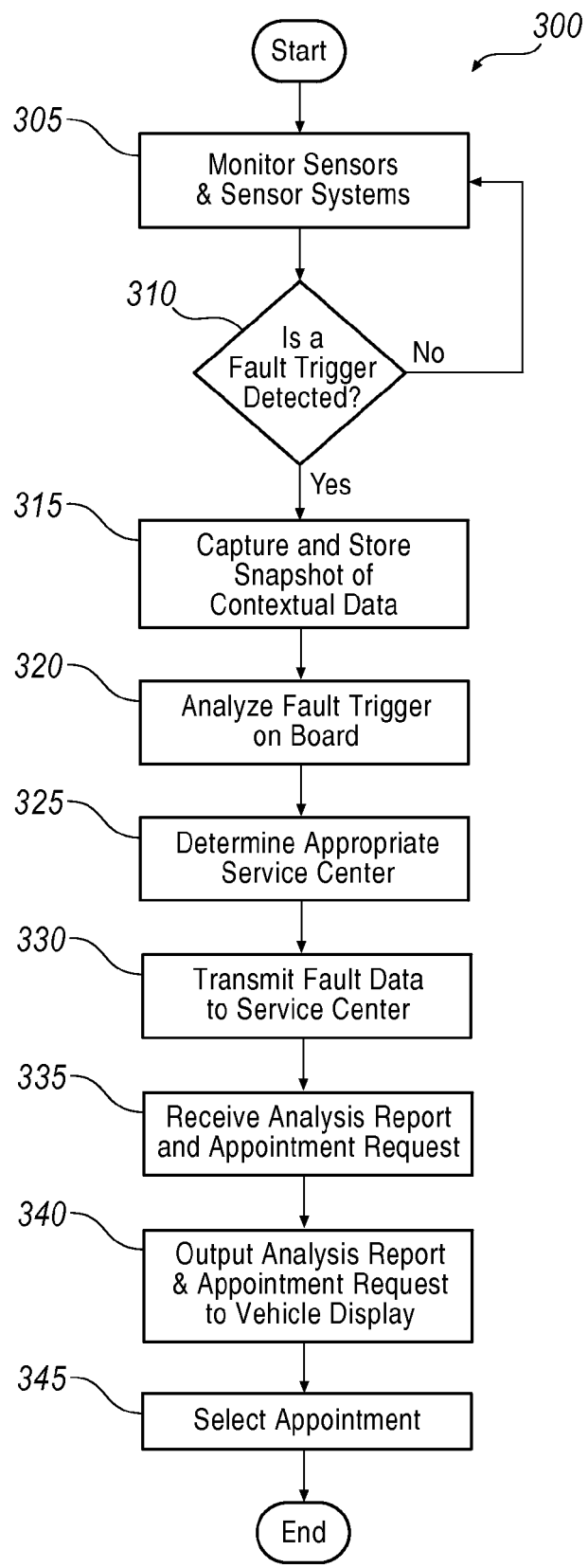
FIG. 3 illustrates a flowchart of an exemplary process implemented by the vehicle diagnostics system of FIG. 1.

FIG. 3 is a flow chart illustrating an exemplary process 300 that may be performed by system 10. At block 305 the controller 105 may monitor the sensors 110 on board the vehicle 100. The controller 105 may monitor the sensor 110 output (e.g., parameter data, contextual data) for abnormalities, such as parameter data falling outside the normal operating range. Additionally, the controller may monitor notifications transmitted from the service center 200 or main server 215, such as product recalls or software updates.

At block 310, the controller 105 may determine if a fault trigger is detected from the sensors 110. The fault trigger may comprise one or more DTCs notifying the controller 105 of an issue with the vehicle. Likewise, the fault trigger may comprise a notification that a system or component is degrading or operating marginally (e.g., no DTC is generated, but the component is degrading). Further, a fault trigger may include product or software updates, product recalls, or maintenance reminders. If no fault trigger is detected, the process returns to block 305. If a fault trigger is detected, the controller 105 may store the fault trigger in the memory device 130 to help create a problem history for the vehicle.

At block 315, the controller 105 may capture and store (via the memory device 130) a snapshot of relevant contextual data taken during the fault trigger. Such contextual data may include, for example, outside temperature, precipitation, and humidity, engine RPMs, air intake, engine coolant temperature, transmission fluid, battery voltage, and vehicle speed. The controller may capture and store single parameter values, such as outside temperature, as well as packets of related parameters (e.g., data packet identifiers). The contextual data may be useful in giving the fault trigger context (e.g., providing the circumstances surrounding the vehicle fault).

At block 320, the controller 105, via the processor 125, may analyze the fault trigger to determine the fault event. For example, if the fault trigger is in the form of a DTC, the processor 125 may communicate with the memory device 130 to access the DTC library in order to determine the underlying issue. Each DTC typically corresponds to a detection item, such as a front right-front tire pressure sensor. The DTC may then be analyzed by referencing the DTC library to determine the underlying issue. For example, the processor 125 may compare the monitored parameter data against a threshold normal operating range for that component stored in the memory 130. If the parameter data falls outside the normal operating range, a DTC may be generated. The controller 105 may further analyze the fault trigger with respect to the snapshot of contextual data captured during the fault trigger and stored in the memory device 130. Likewise, the processor 125 may analyze the components and systems for marginal operation, for example, by checking the throttle position at a given speed load point for the air filter quality.

Additionally, the memory device 130 may store problem history, such as the total number of DTCs triggered by a particular component, indicating whether the fault trigger is an isolated event or a reoccurring problem. The processor 125 may communicate with the memory device 130 to determine whether the component or system has an problem history. If the fault trigger is a reoccurring problem, such as the frontright wheel constantly losing pressure, the problem history may indicate that the fault event requires a more complex solution (e.g., resealing the tires) rather than a quick fix (e.g., adding air to the tire).

At block 325, the telematics device 115 may determine the closest or preferred service center 200 in relation to the vehicle 100. The closest service center 200 may be determined, for example, by the navigation unit within the telematics device 115 (e.g., GPS or any other suitable position technology). The telematics device 115 may likewise identify the closest service centers 200 within a predefined radius of the vehicle 100 (e.g., all service centers 200 within twenty miles of the vehicle 100). Additionally or alternatively, the vehicle user may define specific preferences regarding the service center 200. For example, the user may desire the vehicle 100 always communicate with the dealership at which the user purchased the vehicle. Furthermore, the telematics device 115 and user preferences may work in cooperation. For example, the user may specify five preferred service centers 200, and the telematics device 115 may determine the closet of the five preferred service centers 200 in which to transmit the fault data. Further, this block may also comprise determining whether the required parts and services are available at the closest or preferred service center 200. If, for example, the required parts are not at the preferred service center 200, the controller 105 may then move to a backup or the second preferred service center 200.

At block 330, the controller 105, via the telematics device 115, may transmit the fault data (e.g., fault event, contextual data, etc.) to the appropriate service center 200. The telematics device 115 may communicate with the service center 200 via a wireless network. For example, the vehicle 100 and service centers 200 may subscribe to a particular cloud-based network. The vehicle, via the controller 105 and telematics device 115, may then communicate directly with a particular service center 200 based on its IP or MAC address. Upon receiving the fault data, the service center 200 may additionally compare the analyzed fault event (e.g., the underlying problem, such as the DTC) with stored information in the knowledge base database, such as product recalls, vehicle problem history, and part availability. The service center 200 may also analyze the fault event in view of the contextual data transmitted by the vehicle 100 to reassess whether the underlying problem of the fault event is the true root cause of the fault.

At block 335, the service center 200 may prepare and communicate an analysis report and appointment request to the vehicle 100. The analysis report may include the status of the fault (e.g., severe, moderate, or negligible), the cost and time needed for repair, and possibly a breakdown of the fault (e.g., need to replace the yaw rate sensor). The appointment request may include both an initial question of whether the user would like to schedule an appointment, as well as proposed day/time slots for the service appointment if the request is accepted. The proposed day/time slot may be based on at least one of the selected service center's available times, the parts, the estimated time needed to address or repair the underlying issue, the user's scheduling preferences, weekends and holidays, and urgency of the repair. Further, there may be multiple day/time slots offered in order to allow the vehicle user to choose the most convenient slot.

At block 340, the telematics device 115 may receive the analysis report and appointment request from the service center 200, relay the information to the controller 105, which may in turn output the information to the vehicle display 120. The analysis report and appointment request may be displayed on the vehicle display 120 or provided in an audio format over the vehicle's audio system. Additionally or alternatively, the analysis report and appointment request may be received via email and text message based on the user's preferences. That is, the user profile may be used to automatically determine the method by which the customer prefers to receive service notifications.

At block 345, the vehicle user may examine the analysis report, and accept or decline the appointment request, for example, by pushing a button on or near the display unit or by uttering a response through the audio system. Additionally or alternatively, the user may delay action on the appointment request (e.g., an "ask me later" button on the vehicle display 120). For example, the user may not have his or her schedule available at the moment and may wish to decide upon the appointment request at a later time. If an appointment request is accepted, the vehicle user may then choose from the list of proposed day/time slots. Upon selecting a day/time slot, the controller 105 may relay the user input to the telematics device 115 for transmission to the service center 200. The service center 200 may confirm the accepted day/time slot is still available after receiving the vehicle user's acceptance, and may optionally confirm the accepted day/time slot with the vehicle user (e.g., by email, text message, phone call, or for visual or audio display in the vehicle).

Figure 4:
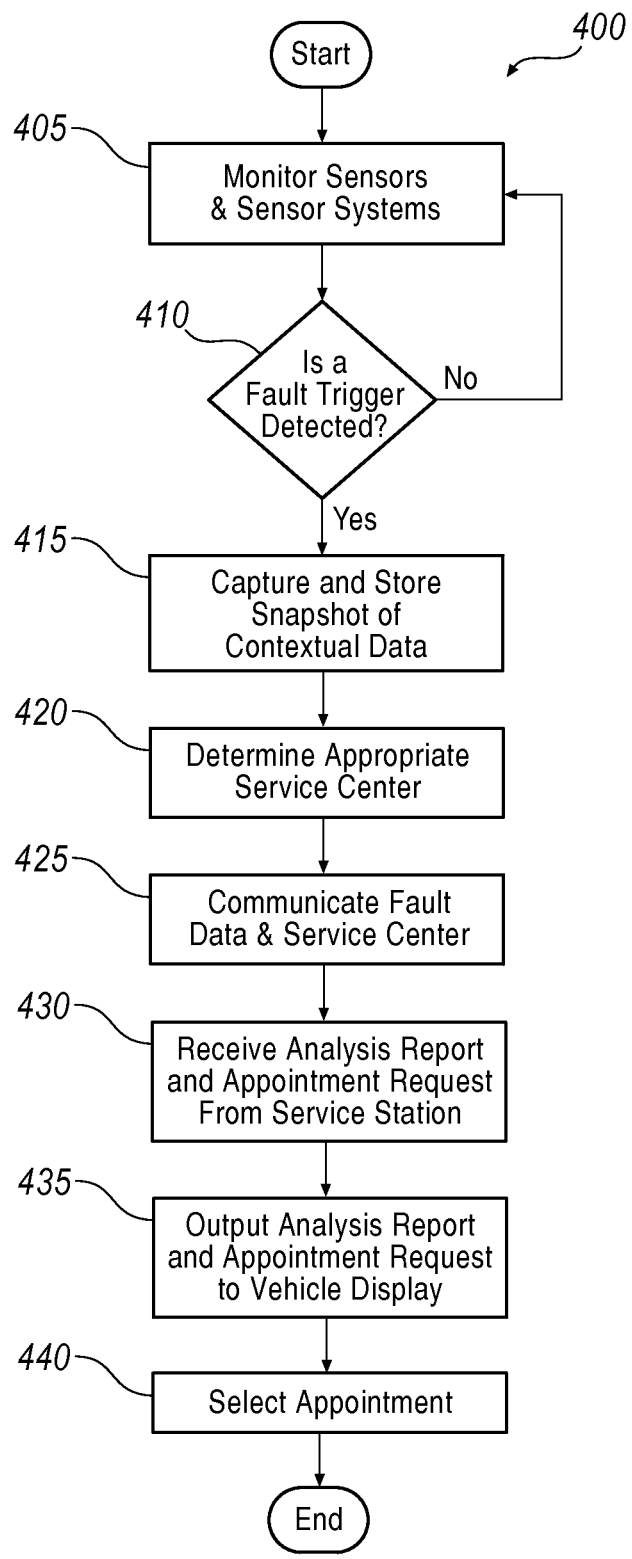
FIG. 4 illustrates a flowchart of an alternative implementation that may be performed by the vehicle diagnostics system of FIG. 1.

FIG. 4 shows an exemplary process 400 for scheduling a service appointment using off-board diagnostics. FIG. 4 is similar to FIG. 3. Specifically, blocks 405-415 of the process 400 are similar to blocks 305-315 of process 300, respectively. At block 420, rather than analyzing the fault trigger on-board the vehicle, the controller 105, via the navigation unit, determines the appropriate service center 200 (e.g., the closest or preferred service center).

At block 425, the controller 105, via the telematics device 115, may communicate the fault trigger and contextual data to the service center 200 in a raw data format. Additionally or alternatively, the controller 105 may communicate the fault trigger and contextual data to the main server 215. The main server 215 may then route the data to the appropriate service center 200 in raw data format. Thus, the controller 105 does not process and analyze the fault data before transmission to the service center 200 or main server 215. The ability to send all the fault data off-board to the service center 200 for analysis may eliminate or reduce on-board diagnostic analysis. This may, in turn, significantly reduce on-board processing and memory requirements in the vehicle 100.

Upon receiving the fault data, the service center 200 may analyze the fault triggers and contextual data to determine the fault event. The service center 200 may be equipped with a computer having similar processes and processing modules as contained in the vehicle 100. The service center 200 may additionally access the knowledge base database for current known problems, problem history stored in the vehicle user profile (e.g., under the vehicle's VIN), or product recalls. The service center 200 may then compare the fault data (e.g., fault trigger, contextual data, or fault event) with the knowledge base information (e.g., problem history, current known use, product recalls, etc.). Additionally or alternatively, the main server 215 may process and analyze the fault data to determine the fault event. Further, the main server may access a knowledge base included at the main server to analyze the fault trigger against current known problems, problem history, or product recalls. After analyzing the fault data, the main server may transmit the information to the appropriate service center 200.

At block 430, the process 400 proceeds as it does with respect to block 335. The service center 200 prepares and communicates an analysis report and appointment request. At block 435, the report and recommendation may be output to the vehicle display, in which the vehicle user may examine the analysis report and accept, postpone, or decline the appointment request. If the request is accepted, the user may choose from a range of available day/time slots to accept the appointment at block 440.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Alternatively, the application software product may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
a vehicle controller having a processor and configured to:
raise a fault trigger responsive to received sensor input indicative of degrading functioning of a vehicle component to outside an optimal range of operation but within a normal operating range threshold;
analyze, via the processor, the fault trigger and contextual data captured during the fault trigger to determine a fault event; and
inform a service center of the fault event.

2. The system of claim 1, wherein a vehicle display of the controller is configured to receive a user input to select an appointment slot from an appointment request in response to a user input, the appointment request being received from the service center responsive to the service center being informed of the fault event.

3. The system of claim 2, wherein the controller is configured to communicate the selected appointment slot to the service center.

4. The system of claim 1, further comprising a memory module in communication with the controller configured to store at least one of a problem history, a service available data, and a product availability data.

5. The system of claim 4, wherein the controller is configured to determine the fault event based at least in part on the problem history stored in the memory module.

6. The system of claim 4, wherein the controller is configured to determine the service center as being appropriate to address the fault event at least in part on at least one of the service availability data and the product availability data.

7. The system of claim 4, wherein the service availability data identifies services available at the service center and the product availability data identifies products available at the service center.

8. The system of claim 7, wherein the memory module is configured to receive at least one of updated service availability data and product availability data from the service center.

9. The system of claim 1, wherein determining the service center as being appropriate to address the fault event is based at least in part on a proximity of the service center to the vehicle controller.

10. The system of claim 1, wherein the service center is predetermined based on a vehicle user preference.

11. A vehicle diagnostics system comprising:
- a sensor for monitoring operational status of a vehicle component;
- a vehicle display configured to receive a user input;
- a communications device configured to communicate with a service center; and
- a processor in communication with the sensor, the vehicle display, and the communication device, wherein the processor is configured to:
  - raise a fault trigger responsive to input from the sensor indicative of degrading functioning of the vehicle component to outside an optimal range of operation but within a normal operating range threshold;
  - determine a close or preferred service center;
  - communicate the fault trigger to the service center;
  - receive an analysis report and an appointment request from the service center; and
  - output the analysis report and appointment request to the vehicle display.

12. The system of claim 11, wherein the processor is configured to analyze the fault trigger to determine a fault event.

13. The system of claim 12, wherein the processor is configured to communicate the fault event to the service center.

14. The system of claim 11, wherein the service center is configured to analyze the fault trigger to determine a fault event.

15. The system of claim 11, wherein the vehicle display is configured to select an appointment slot from the appointment request in response to the user input.

16. The system of claim 15, wherein the processor is configured to transmit the selected appointment slot to the service center.

17. The system of claim 11, wherein the processor is configured to receive a product recall alert from the service center, wherein the processor is configured to output the product recall alert to the vehicle display.

18. A method for scheduling vehicle services comprising:
- detecting a fault trigger responsive to sensor input received from a vehicle sensor, the sensor input indicating degrading functioning of a vehicle component to outside an optimal range of operation but within a normal operating range threshold;
- analyzing the fault trigger to determine a fault event, wherein the fault event identifies an underlying problem associated with the fault trigger;
- determining, via a vehicle controller, an appropriate service center;
- transmitting the fault event to the service center;
- receiving, via the vehicle controller, an analysis report and an appointment request from the service center; and
- outputting the analysis report and appointment request to a vehicle display.

19. The method of claim 18, further comprising selecting an appointment slot associated with the appointment request, wherein the selection of the appointment slot transmits the selected appointment slot to the service center.

20. The method of claim 18, further comprising accessing, from a memory device, a contextual data associated with the fault trigger, wherein the contextual data is captured and stored during the fault trigger.

\* \* \* \* \*